(12) United States Patent
McCord et al.

(10) Patent No.: US 9,939,036 B2
(45) Date of Patent: Apr. 10, 2018

(54) FRICTION MATERIALS

(75) Inventors: Herschel L. McCord, Longview, TX (US); Robert A. Denes, Des Plaines, IL (US); Benjamin S. Lambers, Marshall, TX (US); Paul M. Prickett, Pontyclun (GB)

(73) Assignee: BorgWarner Inc., Auburn Hills, MI (US)

( * ) Notice: Subject to any disclaimer, the term of this patent is extended or adjusted under 35 U.S.C. 154(b) by 1299 days.

(21) Appl. No.: 12/492,261

(22) Filed: Jun. 26, 2009

(65) Prior Publication Data

US 2009/0324887 A1   Dec. 31, 2009

Related U.S. Application Data

(60) Provisional application No. 61/133,632, filed on Jun. 30, 2008.

(51) Int. Cl.
*B32B 5/16* (2006.01)
*F16D 69/02* (2006.01)

(52) U.S. Cl.
CPC .... *F16D 69/026* (2013.01); *F16D 2250/0038* (2013.01); *Y10T 156/10* (2015.01); *Y10T 428/24372* (2015.01)

(58) Field of Classification Search
USPC ................................................ 428/143, 323
See application file for complete search history.

(56) References Cited

U.S. PATENT DOCUMENTS

| 1,039,168 | A | 9/1912 | Melton |
| 1,682,198 | A | 8/1928 | Sitton |
| 1,860,147 | A | 5/1932 | Hadley |
| 2,100,347 | A | 11/1937 | Nanfeldt |
| 2,182,208 | A | 12/1939 | Nason |
| 2,221,893 | A | 11/1940 | White |
| 2,307,814 | A | 1/1943 | Walters |
| 2,316,874 | A | 4/1943 | Kraft |
| 2,354,526 | A | 7/1944 | Lapsley et al. |
| 2,516,544 | A | 7/1950 | Breeze |
| 2,555,261 | A | 5/1951 | Walters |
| 2,702,770 | A | 2/1955 | Steck |
| 2,749,264 | A | 6/1956 | Emrick |
| 2,779,668 | A | 1/1957 | Daniels |
| 3,020,139 | A | 2/1962 | Camp et al. |
| 3,080,028 | A | 3/1963 | Kennedy |
| 3,215,648 | A | 11/1965 | Duffy |
| 3,270,846 | A | 9/1966 | Arledter et al. |
| 3,429,766 | A | 2/1969 | Stormfeltz |
| 3,520,390 | A | 7/1970 | Bentz |
| 3,526,306 | A | 9/1970 | Bentz |
| 3,578,122 | A | 5/1971 | Magnier |

(Continued)

OTHER PUBLICATIONS

H. Gao, G. C. Barber and H. Chu, Friction Characteristics of a Paper-Based Friction Material, International Journal of Automotive Technology, vol. 3, No. 4, pp. 171-176 (2002).

(Continued)

*Primary Examiner* — Laura A Auer
(74) *Attorney, Agent, or Firm* — BrooksGroup

(57) ABSTRACT

One exemplary embodiment may include a friction material having a base layer and a secondary layer over the base layer. The secondary layer may include carbon particles having a tightly controlled particle size distribution.

1 Claim, 2 Drawing Sheets

(56) References Cited

U.S. PATENT DOCUMENTS

| | | |
|---|---|---|
| 3,654,777 A | 4/1972 | Grundman |
| 3,746,669 A | 7/1973 | Dunnom |
| 3,871,934 A | 3/1975 | Marin |
| 3,885,006 A | 5/1975 | Hatch et al. |
| 3,899,050 A | 8/1975 | Savary et al. |
| 3,911,045 A | 10/1975 | Hartmann et al. |
| 3,927,241 A | 12/1975 | Augustin |
| 3,944,686 A | 3/1976 | Froberg |
| 3,950,047 A | 4/1976 | Capelli |
| 3,980,729 A | 9/1976 | Yokokawa et al. |
| 4,002,225 A | 1/1977 | Marin |
| 4,020,226 A | 4/1977 | Andrianov et al. |
| 4,033,437 A | 7/1977 | Labat |
| 4,045,608 A | 8/1977 | Todd |
| 4,051,097 A | 9/1977 | Aldrich |
| 4,084,863 A | 4/1978 | Capelli |
| 4,098,630 A | 7/1978 | Morse |
| 4,113,894 A | 9/1978 | Koch, II |
| 4,150,188 A | 4/1979 | Brulet |
| 4,209,086 A | 1/1980 | Friedrich |
| 4,197,223 A | 4/1980 | Bartram |
| 4,226,906 A | 10/1980 | Jacob |
| 4,239,666 A | 12/1980 | Jacko et al. |
| 4,256,801 A | 3/1981 | Chuluda |
| 4,259,397 A | 3/1981 | Saito et al. |
| 4,260,047 A | 4/1981 | Nels |
| 4,267,912 A | 5/1981 | Bauer et al. |
| 4,291,794 A | 9/1981 | Bauer |
| 4,320,823 A | 3/1982 | Covaleski |
| 4,324,706 A | 4/1982 | Tabe et al. |
| 4,352,750 A | 10/1982 | Eschen |
| 4,373,038 A | 2/1983 | Moraw et al. |
| 4,374,211 A | 2/1983 | Gallagher et al. |
| 4,396,100 A | 8/1983 | Eltze |
| 4,444,574 A | 4/1984 | Tradwell et al. |
| 4,451,590 A | 5/1984 | Fujimaki et al. |
| 4,453,106 A | 6/1984 | La Fiandra |
| 4,456,650 A | 6/1984 | Melotik et al. |
| 4,457,967 A | 7/1984 | Chareire et al. |
| 4,490,432 A | 12/1984 | Jordan |
| 4,514,541 A | 4/1985 | Frances |
| 4,522,290 A | 6/1985 | Klink |
| 4,524,169 A | 6/1985 | Wolff et al. |
| 4,543,106 A | 9/1985 | Parekh |
| 4,563,386 A | 1/1986 | Schwartz |
| 4,593,802 A | 6/1986 | Danko, Jr. |
| 4,628,001 A | 12/1986 | Sasaki et al. |
| 4,639,392 A | 1/1987 | Nels et al. |
| 4,646,900 A | 3/1987 | Crawford et al. |
| 4,656,203 A | 4/1987 | Parker |
| 4,657,951 A | 4/1987 | Takarada et al. |
| 4,663,230 A | 5/1987 | Tennent |
| 4,663,368 A | 5/1987 | Harding et al. |
| 4,672,082 A | 6/1987 | Nakagawa et al. |
| 4,674,616 A | 6/1987 | Mannino, Jr. |
| 4,694,937 A | 9/1987 | Jonas |
| 4,698,889 A | 10/1987 | Patzer et al. |
| 4,700,823 A | 10/1987 | Winckler |
| 4,726,455 A | 2/1988 | East |
| 4,732,247 A | 3/1988 | Frost |
| 4,742,723 A | 5/1988 | Lanzerath et al. |
| 4,743,634 A | 5/1988 | Royer |
| 4,770,283 A | 9/1988 | Putz et al. |
| 4,772,508 A | 9/1988 | Brassell |
| 4,792,361 A | 12/1988 | Double et al. |
| 4,861,809 A | 8/1989 | Ogawa et al. |
| 4,878,282 A | 11/1989 | Bauer |
| 4,913,267 A | 4/1990 | Campbell et al. |
| 4,915,856 A | 4/1990 | Jamison |
| 4,917,743 A | 4/1990 | Gramberger et al. |
| 4,918,116 A | 4/1990 | Gardziella et al. |
| 4,927,431 A | 5/1990 | Buchanan et al. |
| 4,950,530 A | 8/1990 | Shibatani |
| 4,951,798 A | 8/1990 | Knoess |
| 4,983,457 A | 1/1991 | Hino et al. |
| 4,986,397 A | 1/1991 | Vierk |
| 4,995,500 A | 2/1991 | Payvar |
| 4,997,067 A | 3/1991 | Watts |
| 5,004,497 A | 4/1991 | Shibata et al. |
| 5,017,268 A | 5/1991 | Clitherow et al. |
| 5,033,596 A | 7/1991 | Genise |
| 5,038,628 A | 8/1991 | Kayama |
| 5,076,882 A | 12/1991 | Oyanagi et al. |
| 5,080,969 A | 1/1992 | Tokumura |
| 5,083,650 A | 1/1992 | Seiz et al. |
| 5,093,388 A | 3/1992 | Siemon, Jr. et al. |
| 5,094,331 A | 3/1992 | Fujimoto et al. |
| 5,101,953 A | 4/1992 | Payvar |
| 5,105,522 A | 4/1992 | Gramberger et al. |
| 5,143,192 A | 9/1992 | Vojacek et al. |
| 5,164,256 A | 11/1992 | Sato et al. |
| 5,211,068 A | 5/1993 | Spitale et al. |
| 5,221,401 A | 6/1993 | Genise |
| 5,233,736 A | 8/1993 | Hill |
| 5,259,947 A | 11/1993 | Kalback et al. |
| 5,266,395 A | 11/1993 | Yamashita et al. |
| 5,269,400 A | 12/1993 | Fogelberg |
| 5,290,627 A | 3/1994 | Ikuta |
| 5,313,793 A | 5/1994 | Kirkwood et al. |
| 5,332,075 A | 6/1994 | Quigley et al. |
| 5,335,765 A | 8/1994 | Takakura et al. |
| 5,354,603 A | 10/1994 | Errede et al. |
| 5,376,425 A | 12/1994 | Asano et al. |
| 5,395,864 A | 3/1995 | Miyoshi et al. |
| 5,396,552 A | 3/1995 | Jahn et al. |
| 5,437,780 A | 8/1995 | Southard et al. |
| 5,439,087 A | 8/1995 | Umezawa |
| 5,445,060 A | 8/1995 | Randall et al. |
| 5,453,317 A | 9/1995 | Yesnik |
| 5,460,255 A | 10/1995 | Quigley et al. |
| 5,472,995 A | 12/1995 | Kaminski et al. |
| 5,474,159 A | 12/1995 | Soennecken et al. |
| 5,478,642 A | 12/1995 | McCord |
| 5,501,788 A | 3/1996 | Romine et al. |
| 5,520,866 A | 5/1996 | Kaminski et al. |
| 5,529,666 A | 6/1996 | Yesnik |
| 5,540,621 A | 6/1996 | Keester et al. |
| 5,540,832 A | 6/1996 | Romino |
| 5,540,903 A | 6/1996 | Romine |
| 5,571,372 A | 11/1996 | Miyaishi et al. |
| 5,585,166 A | 12/1996 | Kearsey |
| 5,615,758 A | 4/1997 | Nels |
| 5,620,075 A | 4/1997 | Larsen et al. |
| 5,639,804 A | 6/1997 | Yesnik |
| 5,646,076 A | 7/1997 | Bortz |
| 5,648,041 A | 7/1997 | Rodgers et al. |
| 5,662,993 A | 9/1997 | Winckler |
| 5,670,231 A | 9/1997 | Ohya et al. |
| 5,671,835 A | 9/1997 | Tanaka et al. |
| 5,674,947 A | 10/1997 | Oishi et al. |
| 5,676,577 A | 10/1997 | Lam et al. |
| 5,705,120 A | 1/1998 | Ueno et al. |
| 5,707,905 A | 1/1998 | Lam et al. |
| 5,718,855 A | 2/1998 | Akahori et al. |
| 5,733,176 A | 3/1998 | Robinson et al. |
| 5,753,018 A | 5/1998 | Lamport et al. |
| 5,753,356 A | 5/1998 | Lam et al. |
| 5,766,523 A | 6/1998 | Rodgers et al. |
| 5,771,691 A | 6/1998 | Kirkwood et al. |
| 5,775,468 A | 6/1998 | Lam et al. |
| 5,776,288 A | 6/1998 | Stefanutti et al. |
| 5,777,791 A | 7/1998 | Hedblom |
| 5,792,544 A | 8/1998 | Klein |
| 5,803,210 A | 9/1998 | Kohno et al. |
| 5,816,901 A | 10/1998 | Sirany |
| 5,827,610 A | 10/1998 | Ramachandran |
| 5,834,551 A | 11/1998 | Haraguchi et al. |
| 5,842,551 A | 12/1998 | Nels |
| 5,845,754 A | 12/1998 | Weilant |
| 5,856,244 A | 1/1999 | Lam et al. |
| 5,858,166 A | 1/1999 | James et al. |
| 5,858,883 A | 1/1999 | Lam et al. |
| 5,889,082 A | 3/1999 | Kaminski et al. |
| 5,895,716 A | 4/1999 | Fiala et al. |

(56) References Cited

U.S. PATENT DOCUMENTS

| | | | |
|---|---|---|---|
| 5,897,737 A | 4/1999 | Quigley | |
| 5,919,528 A | 7/1999 | Huijs et al. | |
| 5,919,837 A | 7/1999 | Kaminski et al. | |
| 5,952,249 A | 9/1999 | Gibson et al. | |
| 5,958,507 A | 9/1999 | Lam et al. | |
| 5,958,608 A * | 9/1999 | Jahn | 428/688 |
| 5,965,658 A | 10/1999 | Smith et al. | |
| 5,975,270 A | 11/1999 | Tokune et al. | |
| 5,975,988 A | 11/1999 | Christianson | |
| 5,989,375 A | 11/1999 | Bortz | |
| 5,989,390 A | 11/1999 | Lee | |
| 5,998,307 A | 12/1999 | Lam et al. | |
| 5,998,311 A | 12/1999 | Nels | |
| 6,000,510 A | 12/1999 | Kirkwood et al. | |
| 6,001,750 A | 12/1999 | Lam | |
| 6,019,205 A | 2/2000 | Willworth | |
| 6,042,935 A | 3/2000 | Krenkel et al. | |
| 6,060,536 A | 5/2000 | Matsumoto et al. | |
| 6,065,579 A | 5/2000 | Nels | |
| 6,074,950 A | 6/2000 | Wei | |
| 6,121,168 A | 9/2000 | Irifune et al. | |
| 6,123,829 A | 9/2000 | Zommerman et al. | |
| 6,130,176 A | 10/2000 | Lam | |
| 6,132,877 A | 10/2000 | Winckler et al. | |
| 6,140,388 A | 10/2000 | Ness et al. | |
| 6,163,636 A | 12/2000 | Stentz et al. | |
| 6,182,804 B1 | 2/2001 | Lam | |
| 6,194,059 B1 | 2/2001 | Yesnik | |
| 6,217,413 B1 | 4/2001 | Christianson | |
| 6,231,977 B1 | 5/2001 | Suzuki et al. | |
| 6,265,066 B1 | 7/2001 | Suzuki et al. | |
| 6,284,815 B1 | 9/2001 | Sasahara et al. | |
| 6,291,040 B1 | 9/2001 | Moriwaki et al. | |
| 6,315,974 B1 | 11/2001 | Murdie et al. | |
| 6,316,086 B1 | 11/2001 | Beier et al. | |
| 6,323,160 B1 | 11/2001 | Murdie et al. | |
| 6,352,758 B1 | 3/2002 | Huang et al. | |
| 6,383,605 B1 | 5/2002 | Ejiri | |
| 6,387,531 B1 | 5/2002 | Bi et al. | |
| 6,423,668 B1 | 7/2002 | Nakanishi et al. | |
| 6,432,151 B1 | 8/2002 | So et al. | |
| 6,432,187 B1 | 8/2002 | Ogawa et al. | |
| 6,524,681 B1 | 2/2003 | Seitz et al. | |
| 6,569,816 B2 | 5/2003 | Oohira et al. | |
| 6,586,373 B2 | 7/2003 | Suzuki et al. | |
| 6,601,321 B1 | 8/2003 | Kendall | |
| 6,630,416 B1 | 10/2003 | Lam et al. | |
| 6,638,883 B2 | 10/2003 | Gaffney et al. | |
| 6,652,363 B2 | 11/2003 | Kramer et al. | |
| 6,668,891 B2 | 12/2003 | Collis | |
| 6,703,117 B2 | 3/2004 | Gruber et al. | |
| 6,808,225 B2 | 10/2004 | Moriyama | |
| 6,831,146 B2 | 12/2004 | Aiba et al. | |
| 6,875,711 B2 | 5/2005 | Chen et al. | |
| 6,951,504 B2 | 10/2005 | Adefris et al. | |
| 6,855,410 B2 | 12/2005 | Buckley | |
| 7,014,027 B2 | 3/2006 | Adair et al. | |
| 7,160,913 B2 | 1/2007 | Schneider | |
| 7,208,432 B1 | 4/2007 | Beier et al. | |
| 7,294,388 B2 | 11/2007 | Lam et al. | |
| 7,332,240 B2 | 2/2008 | O'Hara et al. | |
| 7,429,418 B2 | 9/2008 | Lam et al. | |
| 2002/0068164 A1 | 6/2002 | Martin | |
| 2002/0164473 A1 | 11/2002 | Buckley | |
| 2003/0050831 A1 | 3/2003 | Klayh | |
| 2003/0053735 A1 | 3/2003 | Vernooy | |
| 2003/0134098 A1 | 6/2003 | Bauer et al. | |
| 2003/0154882 A1 | 8/2003 | Nagata et al. | |
| 2004/0006192 A1 | 1/2004 | Aiba et al. | |
| 2004/0033341 A1 | 2/2004 | Lam et al. | |
| 2004/0043193 A1 | 3/2004 | Chen et al. | |
| 2004/0043243 A1 | 3/2004 | Chen et al. | |
| 2004/0081795 A1 | 4/2004 | Wang et al. | |
| 2004/0081813 A1 | 4/2004 | Dong | |
| 2004/0192534 A1 | 9/2004 | Nixon et al. | |
| 2004/0198866 A1 | 10/2004 | Sasaki | |
| 2004/0224864 A1 | 11/2004 | Patterson et al. | |
| 2005/0004258 A1 | 1/2005 | Yamamoto et al. | |
| 2005/0025967 A1 | 2/2005 | Lawton et al. | |
| 2005/0039872 A1 | 2/2005 | Kimura et al. | |
| 2005/0064778 A1 | 3/2005 | Lam et al. | |
| 2005/0074595 A1 | 4/2005 | Lam | |
| 2005/0075019 A1 | 4/2005 | Lam et al. | |
| 2005/0075021 A1 | 4/2005 | Lam et al. | |
| 2005/0075022 A1 | 4/2005 | Lam | |
| 2005/0075413 A1 | 4/2005 | Lam | |
| 2005/0075414 A1 | 4/2005 | Lam et al. | |
| 2005/0191477 A1 | 9/2005 | Dong | |
| 2005/0271876 A1 | 12/2005 | Walker et al. | |
| 2005/0281971 A1 | 12/2005 | Lam et al. | |
| 2006/0008635 A1 | 1/2006 | Dong et al. | |
| 2006/0019085 A1 | 1/2006 | Lam et al. | |
| 2006/0062987 A1 | 3/2006 | Niewohner et al. | |
| 2006/0121263 A1 | 6/2006 | Komori et al. | |
| 2006/0151912 A1 | 6/2006 | Bauer | |
| 2006/0241207 A1 | 10/2006 | Lam et al. | |
| 2007/0011951 A1 | 1/2007 | Gaeta et al. | |
| 2007/0062777 A1 | 3/2007 | Zagrodzki et al. | |
| 2007/0117881 A1 | 5/2007 | Watanabe et al. | |
| 2007/0205076 A1 | 9/2007 | Takahashi et al. | |
| 2008/0308365 A1 * | 12/2008 | Foge et al. | 188/251 A |

OTHER PUBLICATIONS

U.S. Appl. No. 11/410,722, Friction Material, Robert C. Lam, filed Apr. 25, 2006.

U.S. Appl. No. 12/225,014, Friction Materials Made With Resins Containing Polar Functional Groups, Timothy P. Newcomb, filed Sep. 10, 2008.

U.S. Appl. No. 10/678,720, Friction Material Containing Partially Carbonized Carbon Fibers, Robert C. Lam, filed Oct. 3, 2003.

U.S. Appl. No. 12/400,904, Frictional Device Comprising at Least One Friction Plate, Eckart Gold, filed Mar. 10, 2009.

U.S. Appl. No. 10/898,882, Porous Friction Material With Nanoparticles of Friction Modifying Material, Robert C. Lam, filed Jul. 26, 2004.

U.S. Appl. No. 10/678,598, Mixed Deposit Friction Material, Robert C. Lam, filed Oct. 3, 2003.

U.S. Appl. No. 10/678,599, High Performance, Durable, Deposit Friction Material, Robert C. Lam, filed Oct. 3, 2003.

U.S. Appl. No. 10/916,328, High Coefficient Woven Friction Material, Robert C. Lam, filed Aug. 11, 2004.

U.S. Appl. No. 12/157,901, Porous Friction Material Comprising Nanoparticles of Friction Modifying Material, Robert C. Lam, filed Jun. 12, 2008.

* cited by examiner

FRICTION MATERIALS

CROSS-REFERENCE TO RELATED APPLICATIONS

This application claims the benefit of U.S. Provisional Application No. 61/133,632, filed Jun. 30, 2008, the disclosure of which is incorporated herein by reference in its entirety.

TECHNICAL FIELD

The technical field generally relates to friction materials including carbon particles.

BACKGROUND OF THE INVENTION

New and advanced continuous torque transmission systems, which may include continuous slip torque converters and shifting clutch systems, are being developed by the automotive industry. These new systems often involve high energy requirements, and possibly limited lubricant availability as a result of energy efficiency gains realized through reductions in oil pump sizes. For example, it is not uncommon for friction materials located within these newer systems to experience high surface speeds up to about 65 m/second and high facing lining pressures up to about 1500 psi. Other issues relating to friction material effectiveness include, but are not limited to, the friction material's (1) heat resistance and ability to dissipate heat in low-lubricant applications, (2) susceptibility to surface coefficient of friction variations, (3) glazing resistance, (4) compatibility with oils or lubricants that may be present, and (5) ability to exhibit a relatively fast torque rise when engaged.

SUMMARY OF EXEMPLARY EMBODIMENTS

One exemplary embodiment includes a product comprising a friction material comprising a base layer and a secondary layer over the base layer. The secondary layer may comprise carbon particles having a tightly controlled particle size distribution in which about 30 to about 60 wt. % of the carbon particles are sized between about 105 and about 210 microns and about 20 to about 30 wt. % are sized between about 74 and about 105 microns.

Another exemplary embodiment includes a product comprising a friction material comprising a base layer and a secondary layer over the base layer. The secondary layer may consist essentially of an adhesive layer and carbon particles. The carbon particles may have a tightly controlled particle size distribution in which about 30 to about 60 wt. % of the carbon particles are sized between about 105 and about 210 microns and about 20 to about 30 wt. % are sized between about 74 and about 105 microns.

Yet another exemplary embodiment includes a method comprising providing a base layer and applying over the base layer a secondary layer. The secondary layer may comprise carbon particles having a tightly controlled particle size distribution in which about 30 to about 60 wt. % of the carbon particles are sized between about 105 and about 210 microns and about 20 to about 30 wt. % are sized between about 74 and about 105 microns.

Other exemplary embodiments of the invention will become apparent from the detailed description that follows. It should be understood that the detailed description and specific examples, while disclosing exemplary embodiments of the invention, are intended for purposes of illustration only and are not intended to limit the scope of the invention as defined by the claims.

DETAILED DESCRIPTION EXEMPLARY EMBODIMENTS

Friction materials may be used in a number of applications throughout a vehicle. Depending on the particular application, such friction materials may need to satisfy certain performance and durability characteristics. A friction material has thus been developed that can function satisfactorily across a robust range of vehicle applications. The friction material may comprise a base layer and a secondary layer over the base layer. The secondary layer may comprise carbon particles having a tightly controlled particle size distribution. The size of the carbon particles employed in the secondary layer may be that of granular or coarse particulate carbon, fine particulate carbon, and even colloidal particulate carbon if desired. This construction of the friction material may be responsible, fully or at least partially, for the friction material's enhanced glazing and thermal resistance, improved compatibility with lubricants, and ability to exhibit a rapid torque rise when initially engaged with another contacting surface.

Figure 1:
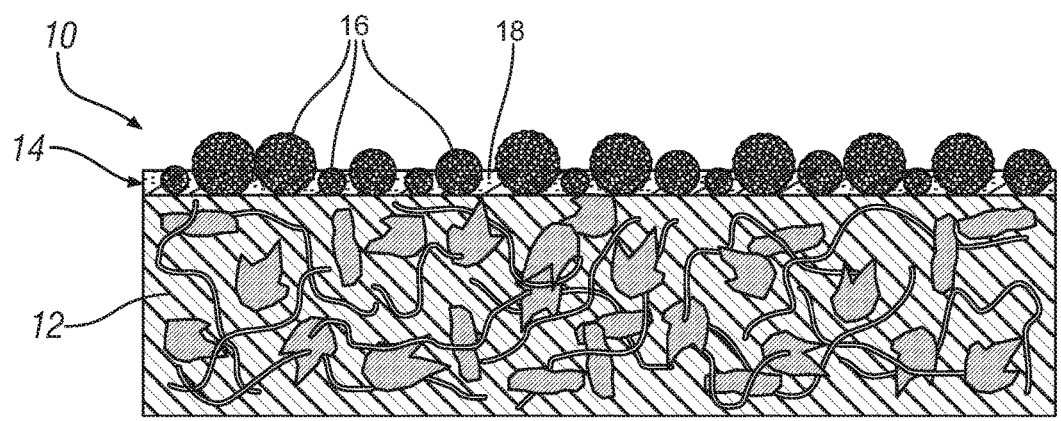
FIG. 1 is a cross-sectional schematic view of a friction material according to one embodiment of the invention.

Referring now to FIG. 1, in one exemplary embodiment, a friction material 10 may comprise a base layer 12 and a secondary layer 14 over the base layer 12. The secondary layer 14 may comprise carbon particles 16 having a tightly controlled particle size distribution in which about 30 to about 60 wt. % of the carbon particles 16 are sized between about 105 and about 210 microns and about 20 to about 30 wt. % are sized between about 74 and about 105 microns. The balance of the carbon particles 16 in the secondary layer 14 may be sized below about 74 microns. A small amount of the carbon particles 16 up to about 0.20 wt. % may also be sized between about 210 microns and about 500 microns without adversely affecting the functionality of the secondary layer 14. While only a few particle sizes are shown in FIG. 1, skilled artisans should understand that FIG. 1 is merely schematic in nature and not intended to represent the actual relative sizes of the carbon particles 16 or to convey that the carbon particles 16 are only present in three sizes. The actual carbon particles 16 in the secondary layer 14 may exhibit many different sizes while still satisfying the carbon particle size distribution just listed. In another embodiment, the secondary layer 14 may have a carbon particle size distribution in which about 40 to about 50 wt. % of the carbon particles 16 are sized between about 105 and about 210 microns and about 20 to about 25 wt. % are sized between about 74 to about 105 microns. The balance of the carbon particles 16 in the secondary layer 14 may be sized below about 74 microns. A small amount of the carbon particles up to about 0.20 wt. % may also be sized between about 210 microns and about 500 microns without adversely affecting the functionality of the secondary layer 14. In yet another embodiment, the secondary layer 14 may have a carbon particle size distribution in which about 0.10 wt. % of the carbon particles 16 are sized between about 210 microns and about 500 microns, about 46 wt. % are sized between about 105 and about 210 microns, about 24 wt. % are sized between about 74 to about 105 microns, and the balance are sized below about 74 microns. A screen analysis of a secondary layer formed in accordance with this latest embodiment is shown below in Table 1.

TABLE 1

| Screen Analysis of Particle Size | | | | | |
|---|---|---|---|---|---|
| Retained on: | 35 Mesh | 70 Mesh | 140 Mesh | 200 Mesh | Pan |
| Particle Size Micron | 500 | 210 | 105 | 74 | Finer than 74 |
| Particle Size Inch | 0.0197 | 0.0083 | 0.0041 | 0.0029 | .0029 |
| Weight Fraction | 0.00% | 0.09% | 46.35% | 24% | Bal. |

The carbon particles 16 of the secondary layer 14 may be those of any suitable allotrope of carbon including, but not limited to, amorphous carbon and graphite. Examples of amorphous carbon include coke, carbon black, and soot. Coke is a high carbon-content material that is generally made by pyrolysis of an organic material that may have passed, at least in part, through a liquid or liquid-crystalline state during a carbonization process. Carbon black is another high-carbon content material and is generally made by thermal decomposition, including detonation, or by the incomplete combustion of carbon-hydrogen compounds. Soot is a randomly formed carbon-based material—generally a byproduct of pyrolysis or incomplete carbon combustion—that may include variable quantities of carbonaceous and inorganic solids together with absorbed and occluded resins and tars. Graphite, on the other hand, is a crystalline allotropic form of carbon that occurs naturally or can be made synthetically by heating appropriate graphite materials to temperatures usually greater that about 2500° K. One particular and commercially available carbon product from which the carbon particles 16 of the secondary layer 14 may be formed is known as Asbury 4099, which is a metallurgical hard carbon coke, available from Asbury Carbons of Asbury, N.J.

The secondary layer 14 may cover anywhere from about 50% to 100% of the upper surface area of the base layer 12. The secondary layer 14 may further have a thickness that ranges from about 35 μm to about 200 μm and more specifically from about 60 μm to about 100 μm. The carbon particles 16 may constitute the entirety of the secondary layer 14 or be combined with other materials, if desired. Also, in some instances, it may be desirable for all of the carbon particles 16 in the secondary layer 14 to have the same general shape and/or the same allotropic carbon composition.

The base layer 12 may be comprised of any known or conventional material or combination of materials appropriate for wet friction applications. Such materials may generally include, for example, a variety of fibers and fillers that are dispersed within resinous matrix. The fibers may be woven or non-woven, and may be organic or inorganic in composition. Notable organic fibers that can be used to make the base layer 12 include fibrillated and/or less fibrillated aramid fibers, acrylic fibers, polyester fibers, nylon fibers, polyamide fibers, carbon fibers, cotton fibers, and cellulose fibers, to name but a few. The fillers may include silica particles such as diatomaceous earth (Celite® and Celatom®) and silicon dioxide. Other exemplary fillers may include carbon particles, alumina particles, and cashew dust. The carbon particles that may be used as fillers in the base layer 12 may have the same particle size distribution as that of the secondary layer 14, but are generally not bound by such a particle size constraint. It should be understood, however, that the materials just described are not the only materials from which the base layer 12 can be derived. Skilled artisans are aware of the vast collection of available materials and compositions that can be used to fabricate the base layer 12 for conjunctive use with the secondary layer 14. They further know how and when to choose the appropriate material or mixture of materials under a given set of circumstances.

The particular combination of fibers and fillers may be chosen to at least partially define the physical characteristics of the base layer 12. For instance, the extent of fibrillation of the aramid fibers and amount of fillers used can help establish the porosity of the base layer 12 as well as its thermal conductivity and mechanical compressibility. The presence of carbon fibers can enhance the heat conduction and heat resistance of the base layer 12. Cotton fibers can provide the base material 12 with shear strength so as to improve delamination resistance and the consistency of the coefficient of friction of the base layer 12.

In one particular embodiment, the materials dispersed within the resinous matrix to form the base layer 12 may comprise about 10% to about 50%, by weight, of a less fibrillated aramid fiber (Canadian Standard Freeness between 450 and 650), about 10% to about 35%, by weight, of activated carbon particles, about 5% to about 20%, by weight, cotton fibers, about 2% to about 15%, by weight, carbon fibers, and about 10% to about 35%, by weight, fillers.

In another particular embodiment, the materials dispersed within the resinous matrix to form the base layer 12 may comprise about 60% to 75%, by weight, fibrillated aramid fibers (Canadian Standard Freeness of less than 350), about 10% to about 15%, by weight, cotton fibers, about 10% to about 20%, by weight, cellulose fibers, about 5% to about 15%, by weight, carbon fibers, and substantially no fillers.

In yet another particular embodiment, the materials dispersed within the resinous matrix to form the base layer 12 may comprise about 40 to about 50%, by weight, aramid fibers (Canadian Standard Freeness of less than 350), about 15 to about 25%, by weight, cotton fibers, about 10 to about 20%, by weight, carbon fibers, friction modifying particles comprising about 5 to about 15%, by weight, celite, and optionally about 1 to about 3%, by weight, latex add-on.

In still another particular embodiment, the materials dispersed within the resinous matrix to form the base layer 12 may comprise about 75% to about 85%, by weight, of a less fibrillated aramid fiber (Canadian Standard Freeness of between 450 and 650), and about 15% to about 25%, by weight, fillers.

The resinous matrix may be formed by first impregnating the other materials that make up the base layer 12 with any one of a variety of curable resin systems. Examples of such resin systems may include, within a suitable solvent or other carrier medium, a phenolic resin, a modified phenolic-based resin, a silicone resin, a modified silicone-based resin, an epoxy resin, a modified epoxy-based resin, and combinations thereof. One such resin system that comprises a combination of resins is a silicone resin blended or mixed with a phenolic resin by way of compatible solvents. For example, a phenolic-silicon resin blend may comprise about 5% to about 80%, by weight, about 15% to about 55%, by weight, or about 15% to about 25%, by weight, of a silicone resin based on the weight of the phenolic-silicone resin mixture (excluding solvents and other processing acids). The modified resins may include ingredients such as epoxies, butadiene, silicone, tung oil, benzene, and cashew nut oil. The percent of resin pick-up by the base layer 12—which refers to the weight percent of the resinous matrix based on the weight of the friction material 10—may range from about 40% to about 80%. In one embodiment, the resin pick-up by the base layer 12 may be about 65%.

The resin system may then be heated to a desired temperature for a predetermined time period to remove the solvent/carrier medium and cure remaining resin material(s) into the resinous matrix of the base layer 12. The applicable time and temperature parameters may vary depending on the resin system's composition but generally range from about 15-60 minutes and from about 150° C. to about 400° C., respectively. It should be understood that the particular resin system used, its precise composition, and its incorporation into the base layer 12 as a resinous matrix are all known and understood by those skilled in the art such that a more complete discussion is not necessary here. Additional information relating to appropriate resin systems and their manufacture, however, can be found in this non-exhaustive list of other related BorgWarner patents: U.S. Pat. No. 5,998,307, U.S. Pat. No. 6,001,750, U.S. Pat. No. 6,875,711, and U.S. Pat. No. 7,429,418.

The secondary layer 14 may be applied over the base layer 12 in one of several known techniques. For example, in one embodiment, a latex adhesive layer 18 may hold and bind the carbon particles 16 of the secondary layer 14 to each other and to the upper surface of the base layer 12 during manufacture of the base layer 12. The carbon particles 16 may also be applied to a similar latex layer—or any other appropriate adhesive layer—that has been previously applied to the upper surface of the base layer 12 either before or after resin impregnation. The carbon particles 16 can also be applied as part of the resin impregnation process in which the resulting resin matrix at least partially bonds the carbon particles 16 to the upper surface of the base layer 12. In still another embodiment, the secondary layer 14 may be applied over the base layer 12 pursuant to the methods disclosed in commonly assigned U.S. Pat. No. 6,001,750. It may also be desirable, in some circumstances, to provide an additional layer between the base layer 12 and the secondary layer 14 to promote improved bonding between the two layers 12, 14 or to provide some other functional property. Skilled artisans familiar with the manufacture of layered substrates and composite materials will be aware of, and understand, other techniques that are nonetheless capable of applying the secondary layer 14 over the base layer 12.

The friction material 10 described in the various embodiments of the invention has been shown to exhibit improved glazing resistance, better compatibility with lubricants and other common oils, and the ability to experience a rapid torque rise when initially engaged with another contacting surface. The improved glazing resistance of the friction material 10 may be attributed to the secondary layer's 14 tendency to abrade the decomposition products of lubricant fluids from adjacent mating surfaces before those products can be transferred to the friction material 10. The friction material's 10 enhanced compatibility with lubricants and oil is likely due to the inertness of the carbon particles 16 in the secondary layer 14. The ability of the friction material 10 to experience a rapid torque rise may be ascribed to the relatively hard and differing sized carbon particles 16 of the secondary layer 14 breaking through the surface lubricant fluid film on an adjacent mating surface and minimizing the hydroplaning effect that sometimes occurs during the initial phase of engagement.

Figure 5:
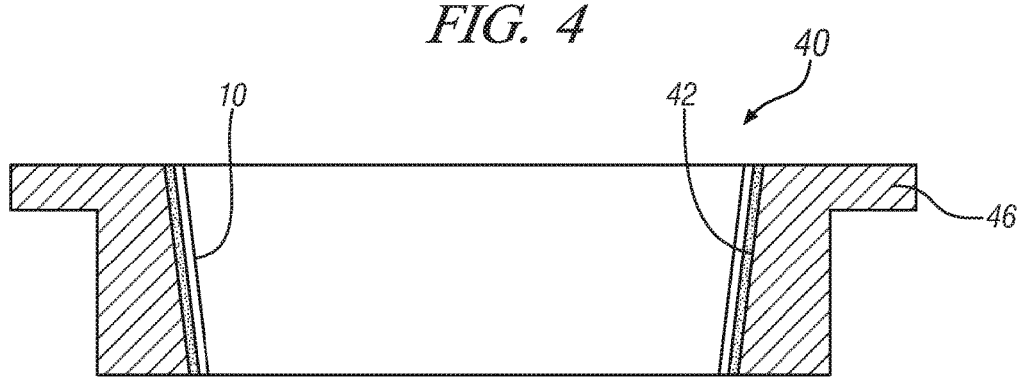
FIG. 5 is a generalized and illustrative cross-sectional view of a synchronizer ring that may include a friction material according to one embodiment of the invention.

The friction material 10 may therefore be utilized with a variety of vehicle components. For example, in one embodiment, the friction material 10 may be employed in a transmission synchronizer assembly at least partly because of its rapid torque rise capabilities. Such synchronizer assemblies may be found in manual, automated-manual, and dual clutch transmissions, and generally include a synchronizer ring 40 (also referred to as a blocker ring) as depicted generally and schematically in FIG. 5. The synchronizer ring 40 may be situated between a sliding selector sleeve and a gear (both not shown). The synchronizer 40 ring may, as shown in this embodiment, have a cone clutch surface 42 on an inner annular wall that includes the friction material 10 for engagement with an associated reactive cone on the gear. The synchronizer ring 40 may also have a number of pointed teeth 46 about its periphery, which can be oriented to either align or cause interference with the teeth of the sliding selector sleeve.

During synchronization, the teeth 46 of the synchronizer ring 40 may be oriented to interfere with and prevent forward travel of the selector sleeve while a differential speed is present between the two components. This is oftentimes referred to as baulking. In order for baulking to occur, the synchronizer ring 40 may need to be clocked in its baulking position during the gear shift. In order for the synchronizer ring 40 to remain clocked in its baulking position, the magnitude of friction torque generated between the friction material 10 on the cone clutch surface 42 and a reaction cone on the gear may need to be greater than the indexing torque resulting from contact between the pointed teeth 46 on the synchronizer ring 40 and the selector sleeve. If, however, an inadequate magnitude of friction torque is generated at any point during synchronization or if the synchronizer ring 40 is not quickly oriented into its baulking position, then the selector sleeve may engage the gear while a differential speed is still present. This may result in something known as gear clash, which may translate to the vehicle driver an unpleasant noise and/or an unfavorable vibration of the transmission or its shift knob.

Figure 2:
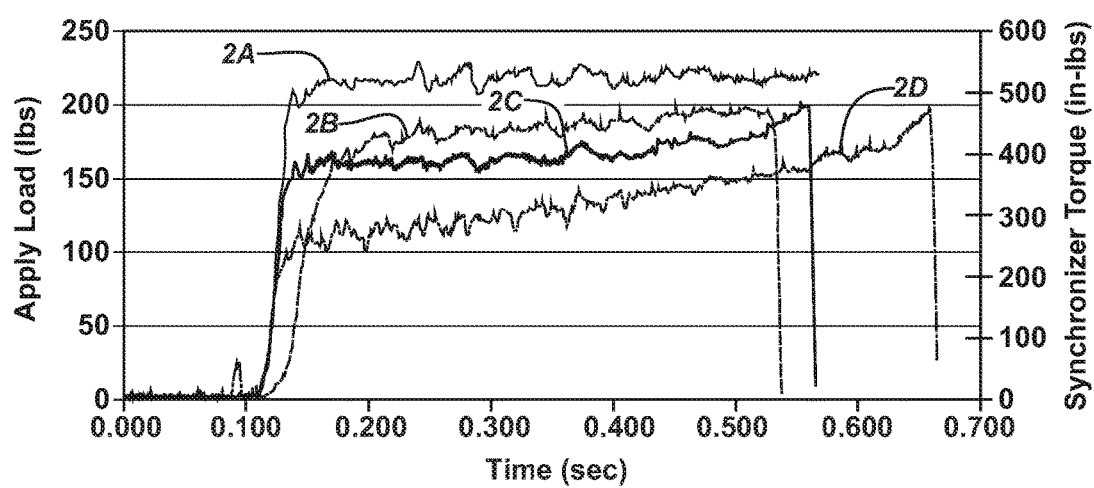
FIG. 2 is a graph showing the performance advantage of increased torque rise with improved friction performance of a friction material according to one embodiment of the invention.
Figure 3:
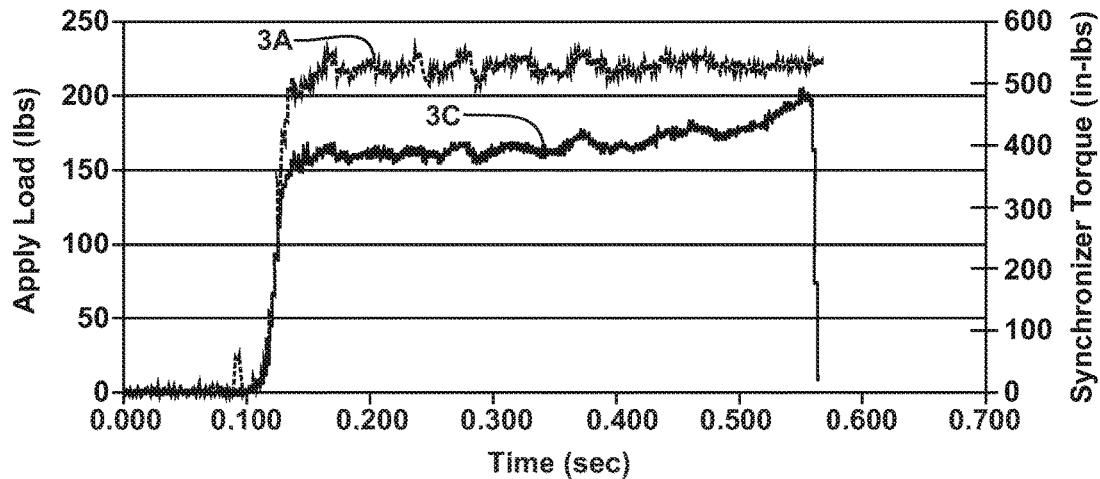
FIG. 3 is a graph showing the combination of adequate torque rise and friction characteristics of a friction material according to one embodiment of the invention.
Figure 4:
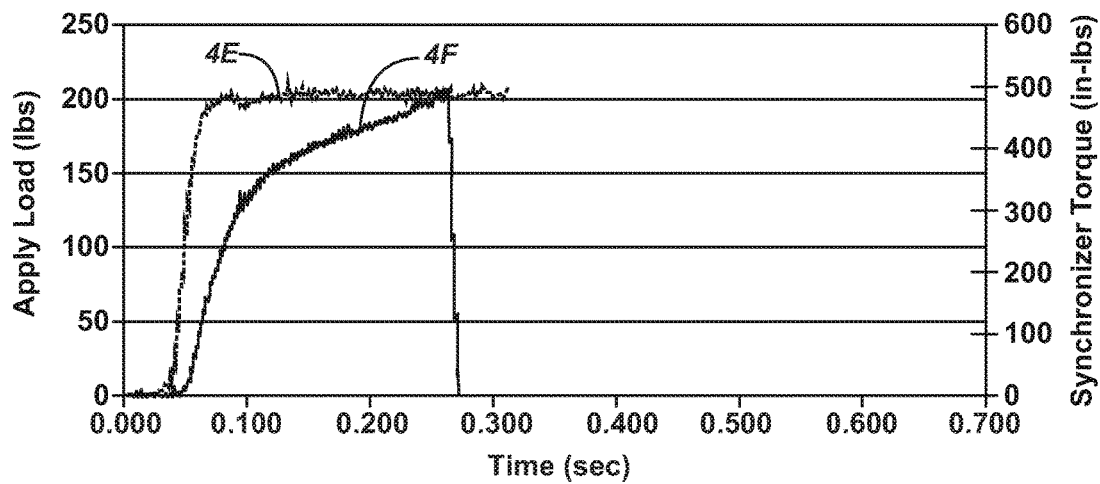
FIG. 4 is a graph showing the results of actual transmission tested parts bonded with a conventional friction material.

The rapid torque rise capabilities of the friction material 10 on the cone clutch surface 42 may thus be helpful in quickly clocking or setting the synchronizer ring 40 in its appropriate baulking position so as to rapidly establish levels of friction that generate a cone torque higher than the indexing torque generated under the load applied by the sliding selector sleeve. The improved torque rise capabilities of the friction material 10 have been observed under simulated synchronizer conditions, and are shown in FIGS. 2 and 3 as compared against other more conventional friction materials. For instance, FIG. 2 plots, against time, an apply force 2A and the torque experienced by three different friction materials: a friction material as described in the various embodiments of the invention 2C, a substantially single composition prior art friction material 2D, and a composite prior art friction material 2B. Under similar circumstances, FIG. 3 plots, against time, an apply force 3A and the torque experienced only by a friction material as described in the various embodiments of this invention 3C. FIG. 4, on the other hand, plots against time an apply force 4E and the torque experienced only by an actual transmission part 4F having a conventional friction material thereon. As can be seen, the friction material 10 of this disclosure generally experiences a more rapid torque rise with little torque lag when compared to other more conventional friction materials.

The friction material 10, although just described as being useful in on a synchronizer ring of a transmission synchronizer assembly, may also be utilized in other components such as, but not limited to, clutch plates, transmission bands, friction discs, and system plates.

The above description of embodiments of the invention is merely exemplary in nature and, thus, variations thereof are not to be regarded as a departure from the spirit and scope of the invention.

We claim:

1. A friction material comprising a base layer and a secondary layer over the base layer, the secondary layer comprising carbon particles having a tightly controlled particle size distribution in which about 30 to about 60 wt. % of the carbon particles are sized between about 105 and about 210 microns and about 20 to about 30 wt. % are sized between about 74 and about 105 microns, and wherein the base layer comprises an upper surface area and the secondary layer covers about 50% to 100% of the upper surface area, wherein the carbon particles constitute the entirety of the secondary layer.

* * * * *